United States Patent [19]
Johno et al.

[11] Patent Number: 5,534,190
[45] Date of Patent: Jul. 9, 1996

[54] ANTI-FERROELECTRIC LIQUID CRYSTAL COMPOSITION AND LIQUID CRYSTAL DISPLAY

[75] Inventors: Masahiro Johno, Tsukuba; Tomoyuki Yui, Nagareyama; Takahiro Matsumoto; Yoshihisa Arai, both of Tsukuba, all of Japan

[73] Assignee: Mitsubishi Gas Chemical Company, Inc., Tokyo, Japan

[21] Appl. No.: 329,057

[22] Filed: Oct. 26, 1994

Related U.S. Application Data

[63] Continuation of Ser. No. 102,277, Aug. 5, 1993, abandoned.

[30] Foreign Application Priority Data

Aug. 5, 1992 [JP] Japan ................................. 4-209058

[51] Int. Cl.⁶ ............................. C09K 19/12; C09K 19/52
[52] U.S. Cl. ............................... 252/299.65; 252/299.66; 252/299.01
[58] Field of Search ...................... 252/299.65, 299.66, 252/299.01

[56] References Cited

U.S. PATENT DOCUMENTS

| | | | |
|---|---|---|---|
| 5,108,650 | 4/1992 | Koden et al. | 252/299.01 |
| 5,171,471 | 12/1992 | Suzuki et al. | 252/299.61 |
| 5,184,847 | 2/1993 | Suzuki et al. | 252/299.65 |
| 5,194,179 | 3/1993 | Suzuki et al. | 252/299.6 |
| 5,207,947 | 5/1993 | Suzuki et al. | 252/299.67 |
| 5,264,150 | 11/1993 | Yui et al. | 252/299.64 |
| 5,352,382 | 10/1994 | Johno et al. | 252/299.65 |
| 5,364,560 | 11/1994 | Mizukami et al. | 252/299.65 |
| 5,364,561 | 11/1994 | Isozaki et al. | 252/299.65 |

FOREIGN PATENT DOCUMENTS

| | | |
|---|---|---|
| 0422613 | 4/1991 | European Pat. Off. |
| 0466573 | 1/1992 | European Pat. Off. |
| 0525737 | 2/1993 | European Pat. Off. |

OTHER PUBLICATIONS

Molecular Crystals And Liquid Crystals vol. 202, Jul. 1991, pp. 85–90 H. Takezoe Et Al. 'Ferrielectric chiral smectic liquid crystalline phase'.

Database WPI Week 9149, Derwent Publications Ltd., London GB; AN 91-357956 & JP-A-3 239 788 (Nippon Oil) 25 Oct. 1991.

Primary Examiner—Cynthia Harris Kelly
Attorney, Agent, or Firm—Sherman and Shalloway

[57] ABSTRACT

An anti-ferroelectric liquid crystal composition consisting essentially of an anti-ferroelectric liquid crystal (A) and a ferrielectric liquid crystal (B) shows a low threshold voltage so that the driving voltage can be decreased, and the composition can give a liquid crystal display device utilizing a fast response time or switching among tristabile states, a distinct threshold voltage characteristic and excellent memory performance.

9 Claims, 2 Drawing Sheets

ANTI-FERROELECTRIC LIQUID CRYSTAL COMPOSITION AND LIQUID CRYSTAL DISPLAY

This application is a continuation of application Ser. No. 08/102,277, filed Aug. 5, 1993 now abandoned.

FIELD OF THE INVENTION

The present invention relates to a novel anti-ferroelectric liquid crystal composition and a liquid crystal display device. More specifically, the present invention relates to an anti-ferroelectric liquid crystal composition which exhibits a low threshold voltage so that the driving voltage can be decreased, and which can be suitably used in a liquid crystal display device utilizing a fast response time or switching among tristable states, distinct threshold characteristics and excellent memory characteristics.

PRIOR ART

Liquid crystal display devices have been and are applied to various small-size display devices due to their operability at low voltages, low power consumption and performance of display with a thin screen. With the recent increase in application and use of liquid crystal display devices to/in the fields of information and office automation-related equipment and television, it is increasingly demanded to develop a high-performance and large-size liquid crystal display device having larger display capacity and higher quality than those of a CRT display device that has been so far available.

Liquid crystal devices that have been practically available use nematic liquid crystals. The vital defect with nematic liquid crystals is that they show a slow change in the orientation of liquid crystal molecules against voltage (low voltage sharpness), i.e., the response time to a change in voltage is slow, and that the viewing angle is small. When these nematic liquid crystals are multiplex-driven, a so-called "crosstalk" phenomenon occurs due to low sharpness of threshold, and with an increase in the of scanning lines, the contrast and viewing angle sharply decrease. There have been therefore developed an active multiplexing liquid crystal display devices whose pixels are provided with switches for switching off pixels that are not in operation and an STN liquid crystal display devices whose sharpness in threshold is improved by increasing the twist angle of the liquid crystal molecules, and the liquid crystal display devices of the above methods are applied to achieve enlarged screens and improvement in display performance.

However, so long as the currently available nematic liquid crystals are used, it is difficult to increase the device size and decrease the production cost even in an active multiplexing liquid crystal display device currently employed for liquid crystal televisions, since the production process is complicated and the yield is low. Further, when the above nematic liquid crystals are applied to a simple multiplexing STN liquid crystal display device, it is not necessarily easy to drive a large-capacity display device, and the response time is limited. It is therefore difficult to display video rate. The nematic liquid crystal devices that are currently available hardly satisfy the above demands for achieving high-performance and large-size liquid crystal display device.

Under the above circumstances, a liquid crystal display device using a ferroelectric liquid crystal is attracting attention as a liquid crystal display device having a fast response time. A surface-stabilized ferroelectric liquid crystal (=SSFLC) device proposed by N. A. Clark and S. T. Lagerwall is attracting attention in that it has a remarkably fast response time and a wide viewing angle [N. A. Clark and S. T. Lagerwall. Appl. Phys. Lett. 36, 899 (1980)]. Switching characteristics of this SSFLC device have been detailedly studied, and various ferroelectric liquid crystals have been synthesized to optimize various physical property parameters.

However, the above ferroelectric liquid crystals have not yet been put to practical use because of a variety of reasons described below. They are insufficient in threshold characteristics. They are poor in contrast since their layer forming a ferroelectric phase has a chevron structure. It is difficult to realize a fast response time. It is difficult to achieve the bistability which is one of the most important characteristics of SSFLC, since it is difficult to control their orientation. It is difficult to recover their orientation when the orientation is destroyed by mechanical shock.

Besides the above SSFLC, the development of devices having a switching mechanism different from that of the above SSFLC is also under way. A switching mechanism in tristable states of a liquid crystal substance having an anti-ferroelectric phase (to be referred to as "anti-ferroelectric liquid crystal substance" hereinafter) is one of these new switching mechanisms (Japanese Journal of Applied Physics, Vol. 27, pp. L729, 1988).

The first feature of the anti-ferroelectric liquid crystal device is that it has three stable states and permits switching among these three stable states. The second feature is that it exhibits a distinct threshold for an applied voltage. Further, the third feature is that it has memory characteristics. These excellent features serve to produce a liquid crystal display device which can exhibit a fast response time and good contrast.

The anti-ferroelectric liquid crystal device has another important feature in that its layer structure undergoes relatively facile switching by an electric field. Due to this feature, it is possible to produce a liquid crystal display device which is almost free of defects and capable of self-restoring the molecular orientation and which is excellent in contrast. Anti-ferroelectric liquid crystal substances are already known as disclosed in Japanese Laid-open Patent Publications Nos. 213,390/1989, 316,339/1989, 316,367/1989, 316,372/1989 and 28,128/1990 and Liquid Crystals, Vol. 6, pp. 167, 1989. Further, anti-ferroelectric liquid crystal substances are being developed, and the number thereof is gradually increasing with the advance in the present inventors' and other researchers' research work.

Currently available TFT and STN liquid crystal display devices using nematic liquid crystals have the above defects, while they have important features in that they can be driven at a low voltage and that their power consumption is small. Therefore, they can be driven by means of a battery, and can be used in an automobile. On the other hand, IC is required for the driving, while they can be fully driven with a less expensive IC since their driving voltage is low. In view of these features, in fact, nematic liquid crystals have practical advantages.

In contrast, known anti-ferroelectric liquid crystals or known anti-ferroelectric liquid crystal compositions have a high threshold voltage for phase transition from an anti-ferroelectric phase to a ferroelectric phase and consequently, the power consumption is large. Further, these liquid crystals or compositions involve a practical problem in that they require a reinforced IC for the driving since their driving voltage is high. It is apparent that these problems can be overcome by decreasing the threshold voltage for phase transition from an anti-ferroelectric phase to a ferroelectric phase.

For overcoming the above problems, Japanese Laid-open Patent Publication No. 223,390/1991 proposes a method of adding an anti-ferroelectric liquid crystal having a different molecular structure to another anti-ferroelectric liquid crystal, a method of adding a compound for adjustment of the temperature range of a liquid crystal phase, a method of adding a liquid crystal having a ferroelectric phase, or a method of adding an optically active compound for the adjustment of a helical pitch, whereby the threshold voltage can be decreased to ½ or less of that before the addition. In these methods, however, the threshold voltage can be decreased only at a temperature of 50° C. or higher, and these methods are not practically effective.

The present inventors have previously found that the threshold voltage can be greatly decreased by a method of increasing the optical purity of an anti-ferroelectric liquid crystal (Japanese Patent Application No. 60,280/1992). However, this method has its own limit. For achieving the driving voltage close to that of a nematic liquid crystal, it is required to decrease the threshold voltage further, and it is desired to develop a new method therefor.

It is therefore an object of the present invention to provide an anti-ferroelectric liquid crystal substance which permits a great decrease in threshold voltage and which therefore can be driven at a very low voltage.

According to the present invention, the above object of the present invention can be achieved by an anti-ferroelectric liquid crystal composition consisting essentially of at least one anti-ferroelectric liquid crystal substance (A) and at least one ferroelectric liquid crystal substance (B).

The ferroelectric liquid crystal substance (B) used in the present invention refers to a liquid crystal substance having a ferroelectric phase. The ferroelectric phase is characterized by a phase in which a ferroelectric phase and an anti-ferroelectric phase are co-present when no voltage is applied (J. Lee et al; Japanese Journal of Applied Physics, 1990, 1122). FIG. 3 schematically shows the ferrielectric phase. In FIG. 3, F0(+) shows the molecular orientation of a ferroelectric phase when it is positively charged, and F0(−) shows the molecular orientation of a ferroelectric phase when it is negatively charged. FI(+) shows the molecular orientation of a ferrielectric phase when it is positively charged, and FI(−) shows the molecular orientation of a ferrielectric phase when it is negatively charged. In the FI phase, the layers located in the fourth to eighth places from the left show an anti-ferroelectric phase, and the other layers exhibit a ferroelectric phase.

The number of ferroelectric liquid crystals that have been so far reported is not large. The following ferroelectric liquid crystals are all that are already known to the best of the present inventors' knowledge. The phase sequences thereof are also shown.

In the phase sequences of the following liquid crystal compounds, I stands for an isotropic phase, SA stands for a smectic A phase, SC* stands for chiral smectic C phase, SCα* and SCβ* stand for unidentified phases similar to an anti-ferroelectric phase, SCγ* stands for a ferroelectric phase, SCA* stands for an anti-ferroelectric phase, SIA* stands for an anti-ferroelectric smectic Z phase, Cr stands for a crystal phase, and the parenthesized figures show temperatures.

(1)　　$C_8H_{17}$—O—Ph—Ph—COO—Ph—COO—$C^*H(CH_3)C_6H_{13}$
I(147° C.)SA(122)SCα*(121)SC*(119)SCγ*(118)SC-A*(65)SIA* (?)Cr
(Japanese Journal of Applied Physics, 28, L1261, 1989)

(2)　　$C_8H_{17}$—Ph—Ph—COO—Ph—COO—$C^*H(CH_3)C_6H_{13}$
I(109° C.)SA(76.3)SCα*(72.1)SCβ*(66.4)SCγ*(64.9)-SCA* (?)Cr (Japanese Journal of Applied Physics, 31, L793, 1992)

(3)　　$C_9H_{19}$—Ph—Ph—$CH_2$O—Ph(3-F)—COO—$C^*H(CH_3)C_6H_{13}$
I(94.9° C.)SC*(44.4)SCγ*(38.7)SCA*(28)Cr (Proceedings of No. 17 Liquid Crystal Symposium, 260(1991))

(4)　　$C_{11}H_{23}$—Ph—Ph—COO—Ph(3-F)—COO—$C^*H(CH_3)C_6H_{13}$
I(94.3° C.)SA(81.4)SC*(76.4)SCγ*(75.8)SCA*(17)Cr (Proceedings of No. 17 Liquid Crystal Symposium, 260(1991))

(5)　　$C_{12}H_{25}$—Ph—Ph—COO—Ph(3-F)—COO—$C^*H(CH_3)C_6H_{13}$
I(92.2° C.)SA(81.3)SC*(71.2)SCγ*(65.6)SCA*(30)Cr (Proceedings of No. 17 Liquid Crystal Symposium, 260(1991))

(6)　　$C_8H_{17}$—O—Ph—Ph—COO—Ph(3-F)—COO—$C^*H(CH_3)C_8H_{17}$
I(101° C.)SA(99)SC*(98.5)SCγ*(97)SCA*(—25)Cr
Japanese Laid-Open Patent Publication No. 178,353/1992

The above liquid crystal compounds characteristically have a stable anti-ferroelectric phase (SCA*) in some temperature ranges in addition to a ferroelectric phase (SCγ*). It can be therefore said that the above compounds are compounds which are either ferroelectric liquid crystals or anti-ferroelectric liquid crystals.

Figure 1:
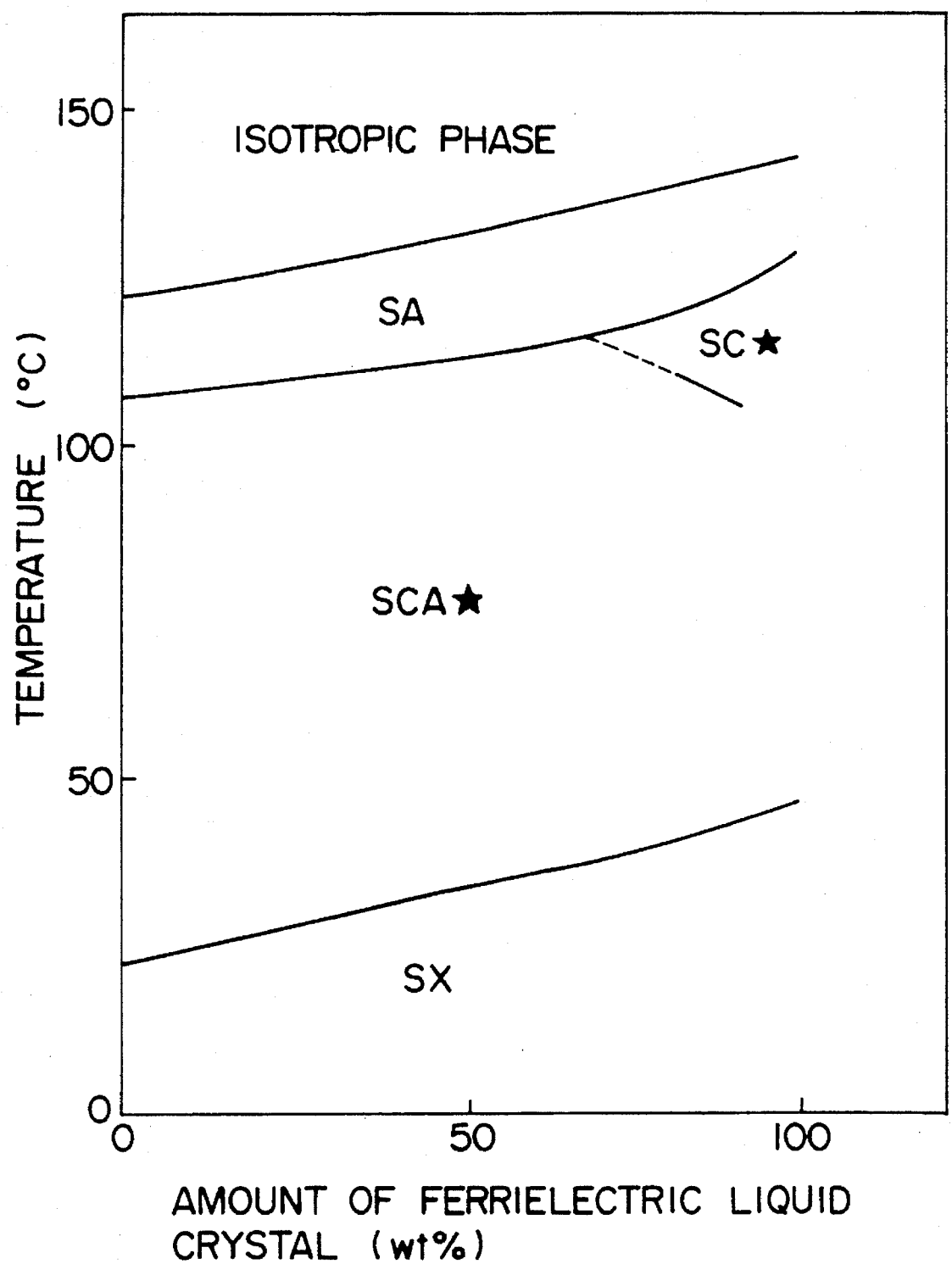
FIG. 1 shows the diagram of the liquid crystal composition obtained in Example 1, based on amounts of a ferroelectric liquid crystal.

The present inventors have found that the following liquid crystals (7)–(20) also have a ferroelectric phase, in addition to the above known ferroelectric liquid crystals.

(7)　　$C_8H_{17}$—O—Ph—COO—Ph—Ph—COO—$C^*H(CH_3)C_4H_9$ I(100° C.)SA(82)SCγ*(70)Cr
(8)　　$C_{10}H_{21}$—O—Ph—Ph—COO—Ph—COO—$C^*H(CH_3)C_5H_{11}$ I(138° C.)SA(125)SCγ*(46)Cr
(9)　　$C_{12}H_{25}$—O—Ph—COO—Ph—COO—$C^*H(CH_3)C_7H_{15}$ I(126° C.)SA(118)SCγ*(44)Cr
(10)　　$C_8H_{17}$—O—Ph—$CH_2$O—Ph—Ph—COO—$C^*H(CF_3)(CH_2)_2OC_2H_5$ I(74° C.)SA(70)SCγ*(50)Cr
(11)　　$C_9H_{19}$—O—Ph—$CH_2$O—Ph—Ph—COO—$C^*H(CF_3)(CH_2)_2OC_2H_5$ I(75° C.)SA(66)SCγ*(50)Cr
(12)　　$C_{10}H_{21}$—Ph—Ph—COO—Ph—COO—$C^*H(CH_3)C_6H_{13}$ I(97° C.)SA(73)SCα*(71)SCγ*(?)Cr
(13)　　$C_9H_{19}$—O—Ph—$CH_2$O—Ph—Ph—COO—$C^*H(CFa)CH_2COOC_2H_5$ I(72° C.)SCγ*(50)SX(38)Cr
(14)　　$C_8H_{17}$—O—Ph—Ph—COO—Ph—COO—$C^*H(CF_3)CH_2COOCH_3$
I(135° C.)SA(126)SCγ*(62)Cr

(15) $C_8H_{17}$—O—Ph—Ph—COO—Ph—COO—C*H(CH$_3$)CH$_2$OC$_6$H$_{13}$
I(147° C.)SA(107)SCγ*(68)Sx(46)Cr

(16) $C_9H_{19}$—O—Ph—Ph—COO—Ph—COO—C*H(CHa)C$_5$H$_{11}$ I(140° C.)SA(118)SCγ*(56)Cr

(17) $C_{12}H_{25}$—O—Ph—COO—Ph—COO—C*H(CH$_3$)C$_5$H$_{11}$ I(131° C.)SA(120)SCγ*(81)Cr

(18) $C_{11}H_{23}$—Ph—Ph—COO—Ph—COO—C*H(CH$_3$)C$_7$H$_{15}$ I(123° C.)SA(117)SCγ*(62)Cr

(19) $C_{10}H_{21}$—O—Ph—CH$_2$O—Ph—Ph—COO—C*H(CF$_3$)(CH$_2$)$_2$OC$_2$H$_5$ I(72° C.)SA(64)SCγ*(44)Cr

(20) $C_8H_{17}$—O—Ph—CH$_2$O—Ph—Ph—COO—C*H(CF$_3$)CH$_2$COOC$_2$H$_5$ I(73° C.)SCγ*(55)SX(?)Cr

A composition containing any one of the above ferroelectric liquid crystals used as the ferroelectric liquid crystal (B) in the present invention and either an anti-ferroelectric liquid crystal (A) or a composition containing an anti-ferroelectric liquid crystal (A) tends to show the following effects, although the effects differ depending upon the kind of the ferroelectric liquid crystal used.

(1) The threshold voltage decreases depending upon the amount of the added ferroelectric liquid crystal (B).

(2) Due to the decrease in the threshold voltage, the response time from an anti-ferroelectric state to a ferroelectric state decreases depending upon the amount of the added ferroelectric liquid crystal (B) when measured at the same voltage.

(3) The temperature range of an anti-ferroelectric phase narrows depending upon the amount of the added ferroelectric liquid crystal (B).

(4) In some ferroelectric liquid crystals, the tilt angle is hardly influenced by the amount of such ferroelectric liquid crystals added.

The above effects can be further explained as follows.

When the above ferroelectric liquid crystal (B) is added to the anti-ferroelectric liquid crystal (A) or a composition containing the anti-ferroelectric liquid crystal (A), the resultant composition shows a great decrease in the threshold voltage.

However, when a liquid crystal compound having both a ferroelectric phase and an anti-ferroelectric phase (such as any one of the above compounds Nos. 1 to 6) is added, there is no or almost no effect on decreasing the threshold voltage. Further, some of such liquid crystal compounds decrease the tilt angle. The tilt angle generally greatly affects the contrast and brightness of a liquid crystal device. That is, a decrease in the tilt angle results in a decrease in the contrast and brightness, which leads to the poor performance of a liquid crystal device in practical use.

Therefore, the above liquid crystal compounds Nos. 1 to 6, which have both a ferroelectric phase and an anti-ferroelectric phase, are not practically preferred, since they do not have much effect on decreasing the threshold voltage.

On the other hand, the above liquid crystal compounds Nos. 7 to 20 are ferroelectric liquid crystals having no anti-ferroelectric phase. These liquid crystal compounds Nos. 7 to 20 are preferred since they cause almost no decrease in the tilt angle, and have an effect on decreasing the threshold voltage.

In a liquid crystal device for practical use, the alignment of a liquid crystal is also an important factor. The alignment is influenced not only by various conditions for producing liquid crystal cells but also by whether or not the liquid crystal has a smectic A phase. For obtaining an excellent alignment, the presence of a smectic A phase is advantageous. From this viewpoint, the above liquid crystal compounds Nos. 7 to 20 excluding the compounds Nos. 13 and 20 are practically preferred.

In general, when the ferroelectric liquid crystal is added for decreasing the threshold voltage, the temperature range of the anti-ferroelectric phase tends to narrows. This tendency strengthens particularly when a liquid crystal phase other than the smectic A phase is present on the high-temperature side and low-temperature side of the ferroelectric phase. For example, the liquid crystal compound No. 12 has an SCα* phase similar to an anti-ferroelectric phase, and when this liquid crystal compound No. 12 is added to an anti-ferroelectric, the temperature range of the anti-ferroelectric phase narrows due to the presence of a ferroelectric phase and SCα*. For this reason, the amount of the liquid crystal compound No. 12 is limited. When a ferroelectric liquid crystal having a liquid crystal phase on the low-temperature side of the ferroelectric phase is added in a certain amount, for example, the liquid crystal has a liquid crystal phase other than an anti-ferroelectric phase on the low-temperature side of the anti-ferroelectric phase, and the temperature range of the anti-ferroelectric phase narrows.

In view of the foregoing, the ferrielectric liquid crystal to be added for decreasing the threshold voltage preferably has the phase sequence of isotropic phase—smectic A phase—ferroelectric phase—crystal phase, and among the above liquid crystal compounds, the above liquid crystal compounds Nos. 7 to 12, 14 and 16 to 19 are preferred. In particular, the above liquid crystal compounds Nos. 7 to 12 are suitable for use in the present invention.

Meanwhile, as the anti-ferroelectric liquid crystal (A), preferred is an anti-ferroelectric liquid crystal having a smectic A phase on the high-temperature side of the anti-ferroelectric phase in view of alignment.

Further, for securing an anti-ferroelectric phase in a broad range on the low-temperature side, the absence of any other liquid crystal phase on the low-temperature side is advantageous. Therefore, the anti-ferroelectric liquid crystal (A) preferably has the phase sequence of isotropic phase—smectic A phase—anti-ferroelectric phase—crystal phase. In view of practical use, the melting point of the anti-ferroelectric liquid crystal is preferably as low as possible. The melting point of the anti-ferroelectric liquid crystal is specifically room temperature or lower, preferably 10° C. or lower, more preferably 0° C. or lower.

For obtaining the sufficient contrast and brightness of a liquid crystal display device, the tilt angle of the anti-ferroelectric liquid crystal (A) is at least 25°, preferably at least 35°, more preferably at least 38°. The amount of the ferroelectric liquid crystal (B) to be added for decreasing the threshold voltage differs depending upon the kinds of the ferroelectric liquid crystal and the anti-ferroelectric liquid crystal, and cannot be generally determined. The anti-ferroelectric liquid crystal (A) and the ferroelectric liquid crystal (B) are preferably mixed in such an amount sufficient for decreasing a voltage required for driving the anti-ferroelectric liquid crystal.

When the liquid crystal compounds Nos. 7 to 12 and Nos. 16 to 19 which are the most preferred are used, the amount of the ferroelectric liquid crystal (B) is preferably 10 to 80% by weight, more preferably 20 to 80% by weight, based on the weight of the composition in view of the tendency of the threshold voltage to decrease, the temperature range of the anti-ferroelectric phase after the addition of the ferroelectric liquid crystal and the melting point of the composition.

The composition obtained by adding the ferroelectric liquid crystal to the anti-ferroelectric liquid crystal is required to be a eutectic mixture. That is, a mixture obtained by merely mixing the liquid crystals exhibits only the characteristics of each liquid crystal, and no effect produced by the addition, i.e., no effect of decreasing the threshold voltage, can be expected.

When the liquid crystal composition containing the ferroelectric liquid crystal has no smectic A phase, the alignment of the liquid crystal is not good to cause a decrease in the contrast. Further, when a phase other than the anti-ferroelectric phase is present, generally, the temperature range of the anti-ferroelectric phase undesirably narrows. Therefore, the liquid crystal composition containing the ferroelectric liquid crystal preferably has the phase sequence of isotropic phase—smectic A phase—anti-ferroelectric phase—crystal phase. The driving voltage for a practical liquid crystal device is determined depending upon the voltage and power consumption of IC for the driving. Naturally, however, the smaller the driving voltage is, the better. In view of the voltage specification of ICs practically used for liquid crystals, the driving voltage of the composition of the present invention is 35 V or less, preferably 25 V or less, more preferably 20 V or less.

The compounds used in the present invention can be produced by a variety of methods. For example, they can be produced as follows.

(a) $HO-Ph-Ph-COOH + RBr + (KOH) \longrightarrow RO-Ph-Ph-COOH$  (1)

(b) $RO-Ph-Ph-COOH + (LiAlH_4) \longrightarrow RO-Ph-Ph-CH_2OH$  (2)

(c) $CH_3COO-Ph-COOH + (SOCl_2) \longrightarrow CH_3COO-Ph-COCl$ (d) $\begin{cases} CH_3COO-Ph-COCl + HOC^*H(CF_3)-(CH_2)_mOC_nH_{2n+1} \\ \text{or} \\ CH_3COO-Ph-COCl + HOC^*H(CF_3)-CH_2COOC_2H_5 \end{cases}$
$\longrightarrow \begin{cases} CH_3COO-Ph-COO-C^*H(CF_3)-(CH_2)_mOC_nH_{2n+1} \\ \text{or} \\ CH_3COO-Ph-COO-C^*H(CF_3)-CH_2COOC_2H_5 \end{cases}$ (e) $\begin{cases} CH_3COO-Ph-COO-C^*H(CF_3)-(CH_2)_mOC_nH_{2n+1} + (Ph-CH_2NH_2) \\ \text{or} \\ CH_3COO-Ph-COO-C^*H(CF_3)-CH_2COOC_2H_5 + (Ph-CH_2NH_2) \end{cases}$
$\longrightarrow \begin{cases} HO-Ph-COO-C^*H(CF_3)-(CH_2)_mOC_nH_{2n+1} & (3) \\ \text{or} \\ HO-Ph-COO-C^*H(CF_3)-CH_2COOC_2H_5 & (4) \end{cases}$ (f) (1) + (3) or (4) + triphenylphosphine/diethyl-azodicarboxylate
$\longrightarrow$ intended compounds In the present invention, the phase sequence of a liquid crystal is determined with DSC and by observing the texture of the liquid crystal through a polarizing microscope equipped with a hot stage. The tilt angle, threshold voltage and response time are determined using an ITO electrode-attached liquid crystal cell (cell thickness 2 μm) having a rubbed thin polyimide film. A liquid crystal is charged into the above cell in an isotropic state and then gradually cooled at a rate of 1° C./minute to align the liquid crystal in an SA phase. The cell is placed such that the layer direction of the liquid crystal is parallel with an analyzer or a polarizer between polarizing plates at right angles with the cell.

While a triangular voltage at 0.2 Hz and ±40 V is applied, the sample is turned until a dark field appears, and the tilt angle is determined on the basis of the turn angle. Further, the transmittance is measured for a change with a photomultiplier, and the threshold voltage was determined on the basis of the hysteresis thereof. Further, the response time is defined as a time required for a change in the transmitted light from 10 to 90% while a step voltage at 25 V is applied, and the response time is measured.

The present invention will be explained more specifically with reference to Examples. However, the present invention shall not be limited thereto.

EXAMPLE 1

An anti-ferroelectric liquid crystal and a ferroelectric liquid crystal were mixed in various mixing ratios. The anti-ferroelectric liquid crystal and ferroelectric liquid crystal used in this Example were as follows.

Anti-ferroelectric liquid crystal:

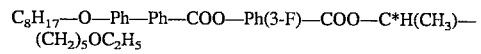

Phase sequence: isotropic phase(121° C.) SA(107) SCA*(22) SX(−16) crystal

Tilt angle: 29°

Threshold voltage (anti-ferroelectric→ferroelectric): 30 V/μm (cell thickness) Ferrielectric liquid crystal:

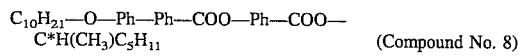   (Compound No. 8)

Phase sequence: isotropic phase(138° C.) SA(125) SCγ*(46) crystal

The ferroelectric liquid crystal in an amount of 30 to 90% by weight was added to the anti-ferroelectric liquid crystal. FIG. 1 shows the diagram in this case. As clearly shown in FIG. 1, the anti-ferroelectric phase was stably present even when the amount of the ferroelectric liquid crystal reached 80% by weight, and the ferroelectric phase (SC* phase) appeared when the above amount exceeded 80% by weight.

Figure 2:
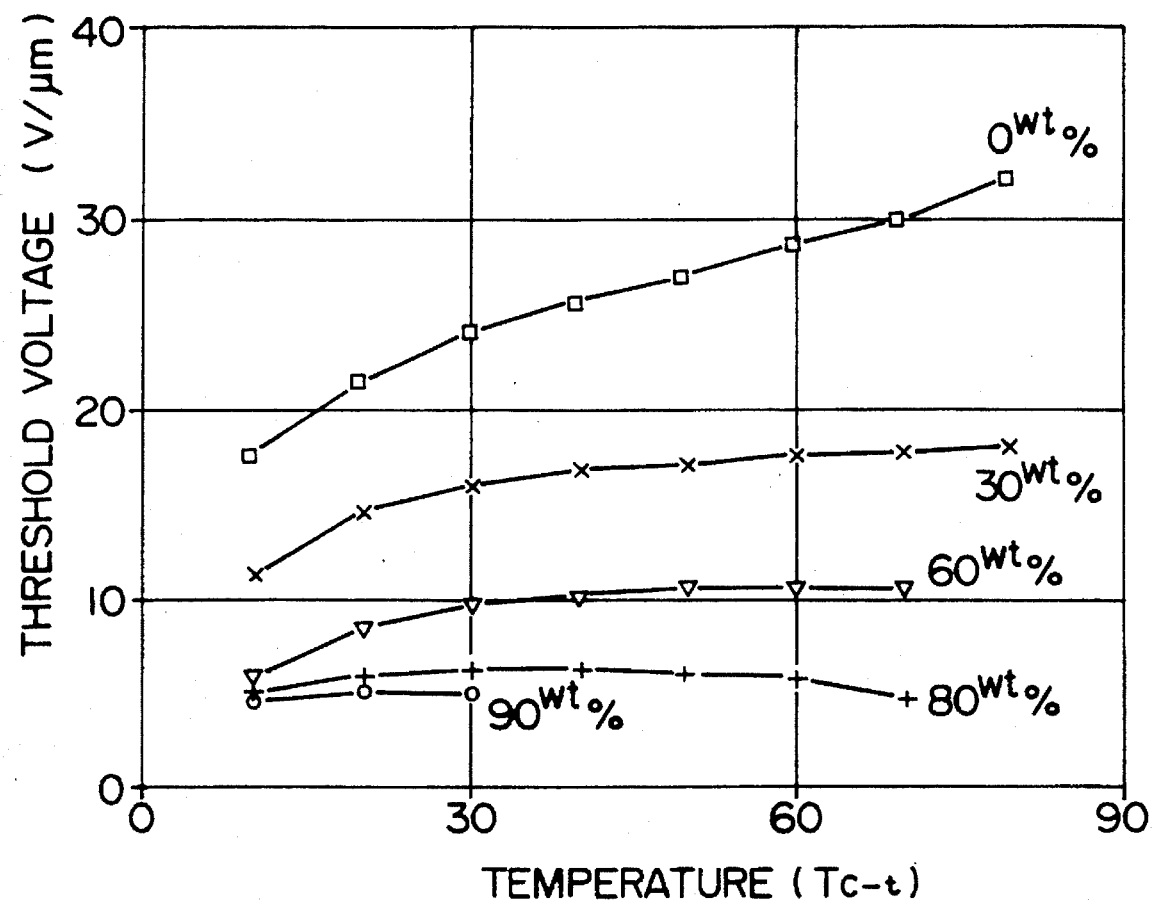
FIG. 2 shows the relationship between the threshold voltage of the liquid crystal composition obtained in Example 2 and the amount of a ferroelectric liquid crystal.
Figure 3:
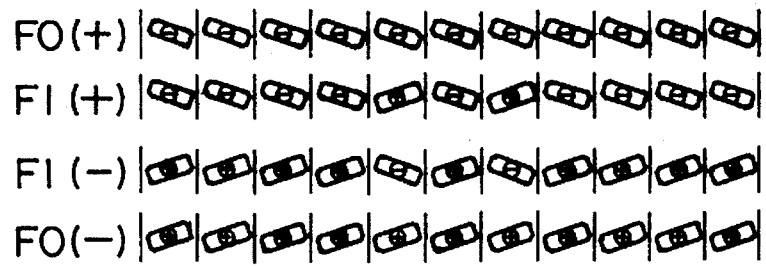
FIG. 3 shows a schematic view of a ferroelectric liquid crystal.

FIG. 2 shows the effect of the added ferroelectric liquid crystal on the threshold voltage. As clearly shown in FIG. 2, the above effect was high, and the threshold voltage was decreased to about ⅕ on the low-temperature side.

EXAMPLE 2

An anti-ferroelectric liquid crystal composition and a ferroelectric liquid crystal were mixed in various mixing rations.

First, the anti-ferroelectric liquid crystal composition having the following contents was prepared.

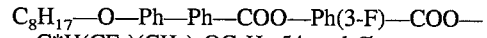 54 mol %

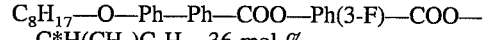 36 mol %

$C_8H_{17}$—O—Ph—COO—Ph—COO—
$C^*H(CF_3)(CH_2)_5OC_2H_5$ 16 mol %

In the above formulae, —Ph(3-F)— means that fluorine is substituted on the 3-position of a phenyl group.

The above liquid crystal composition had the following phase sequence.

Isotropic phase(100° C.) SA(88) SCA*(–8) SX(unidentified) crystal

The ferroelectric liquid crystal which was added to the above liquid crystal composition had the following chemical structure and phase sequence.

$C_8H_{17}$—O—Ph—$CH_2$O—Ph—Ph—COO—
$C^*H(CF_3)(CH_2)_2OC_2H_5$ (Compound No. 10)

Isotropic phase (74° C.) SA(70) SCγ*(50) crystal

The resultant liquid crystal composition was measured for physical property values at 25° C.

Table 1 shows the effects of the added ferroelectric liquid crystal.

TABLE 1

| | Physical property value of anti-ferroelectric liquid crystal composition | | | | |
|---|---|---|---|---|---|
| Amount of ferri-electric liquid crystal (wt. %) | 0 | 10 | 15 | 20 | 30 |
| Temperature range of SCA* phase (° C.) | 88–(–8) | 76–(–7) | 68–(–4) | 52–1 | no anti-ferro-electric phase |
| Threshold voltage (V/m) | 9.1 | 7.4 | 6.4 | 2.6 | — |
| Tilt angle (°) | 32.3 | 31.9 | 32.0 | 31.7 | — |
| Response time* (microsecond) | 526 | 159 | 132 | 76 | — |

*Measured for a time (anti-ferroelectric → ferroelectric) at an application voltage of 25 V.

As shown in Table 1, the anti-ferroelectric phase was stably present even when the amount of the ferroelectric liquid crystal reached 20% by weight, while it disappeared when the above amount came up to 30% by weight. In this Example, with an increase in the amount of the ferroelectric liquid crystal, the threshold voltage decreased, and the response time was accordingly improved.

EXAMPLES 3–8

An anti-ferroelectric liquid crystal having the following chemical formula was mixed with the following ferroelectric liquid crystals, and the resultant compositions were measured for physical property values. Table 2 shows the results.

Table 2 shows that the threshold voltage (V/μm) of each of the compositions obtained in Examples 3 to 8 desirably decreased and that the decrease in the tilt angle thereof was desirably small.

Anti-ferroelectric liquid crystal:

$C_9H_{19}$—O—Ph—Ph—COO—Ph(3-F)—COO—
$C^*H(CF_3)(CH_2)_5OC_2H_5$

Ferrielectric liquid crystals:

$C_8H_{17}$—O—Ph—COO—Ph—Ph—COO—
$C^*H(CH_3)C_4H_9$ (Compound No. 7)

$C_{10}H_{21}$—O—Ph—Ph—COO—Ph—COO—
$C^*H(CH_3)C_5H_{11}$ (Compound No. 8)

$C_{12}H_{25}$—O—Ph—Ph—COO—$C^*H(CH_3)$-$C_7H_{15}$ (Compound No. 9)

$C_9H_{19}$—O—Ph—$CH_2$O—Ph—Ph—COO—
$C^*H(CF_3)(CH_2)_2OC_2H_5$ (Compound No. 11)

$C_{10}H_{21}$—Ph—Ph—COO—Ph—COO—
$C^*H(CH_3)C_6H_{13}$ (Compound No. 12)

$C_9H_{19}$—O—Ph—$CH_2$O—Ph—Ph—COO—
$C^*H(CF_3)CH_2COOC_2H_5$ (Compound No. 13)

TABLE 2

| | | | Physical property value of anti-ferroelectric liquid crystal composition | | | | | | | |
|---|---|---|---|---|---|---|---|---|---|---|
| | Ferrielectric | | Phase sequence | Threshold voltage (V/μm) | | | Tilt angle (°) | | | |
| Ex. No. | liquid crystal compound No. | Amount (st. %) | (Parenthesized figure shows temperature) (°C.) | 60° C. | 40° C. | 20° C. *1 | 40° C. | 30° C. | 20° C. | 10° C. *1 |
| — | (anti-ferroelectric liquid crystal alone) | | I(83)SC*(82)SCA*(?)Cr | 4.9 | 5.3 | 5.0 | 37 | 37 | 36 | 36 |
| 3 | 7 | 20 | I(104)SA(94)SCγ*(91)SCA*(?)Cr | 4.5 | 4.5 | 4.2 | | | | 31 |
| 4 | 8 | 20 | I(100)SA(94)SCγ*(88)SCA*(?)Cr | 4.0 | 4.0 | 4.2 | 36 | 36 | | |
| 5 | 9 | 20 | I(96)SA(94)SCγ*(83)SCA*(?)Cr | 3.8 | 3.5 | 3.0 | 36 | 36 | | |
| 6 | 11 | 10 | I(81)SA(94)SCγ*(70)SCA*(?)Cr | 2.7 | 3.1 | 2.0 | | | | 34 |
| 7 | 12 | 20 | I(89)SA(85)SCγ*(81)SCA*(?)Cr | 4.5 | 4.4 | 3.5 | | 35 | | |
| 8 | 13 | 20 | I(80)SC*(71)SCA*(?)Cr | 3.5 | 3.6 | 2.9 | | | | 34 |

*1: (°C.) stands for (Tc–T). Tc is a transition temperature from SCγ* to SCA* and T is a measurement temperature.

EXAMPLES 9–12

The same anti-ferroelectric liquid crystal as that used in Example 3 was mixed with 20% by weight of ferroelectric liquid crystals having the following formulae, and the resultant compositions were measured for physical property values. Table 3 shows the results.

Table 3 shows that the compositions obtained in Examples 9 to 12 showed a decrease in the threshold voltage (V/μm) at low temperatures but showed almost no decrease in the threshold voltage at high temperatures such as 60° C. and 40° C.

Ferrielectric liquid crystals:

$C_8H_{17}$—O—Ph—Ph—COO—Ph—COO—
　$C^*H(CF_3)CH_2COOCH_3$　　　(Compound No. 14)

$C_8H_{17}$—O—Ph—Ph—COO—Ph—COO—
　$C^*H(CH_3)CH_2OC_6H_{13}$　　　(Compound No. 15)

$C_8H_{17}$—O—Ph—Ph—COO—Ph—COO—
　$C^*H(CH_3)C_6H_{13}$　　　(Compound No. 1)

$C_8H_{17}$—Ph—Ph—COO—Ph—COO—
　$C^*H(CH_3)C_6H_{13}$　　　(Compound No. 2)

TABLE 3

| | Ferri-electric liquid crystal compound No. | Amount (st. %) | Phase sequence (Parenthesized figure shows temperature) (°C.) | Threshold voltage V/μm | | | Tilt angle (°) | | | |
|---|---|---|---|---|---|---|---|---|---|---|
| Ex. No. | | | | 60° C. | 40° C. | 20° C. *1 | 40° C. | 30° C. | 20° C. | 10° C. *1 |
| — | (anti-ferroelectric liquid crystal alone) | | I(83)SC*(82)SCA*(?)Cr | 4.9 | 5.3 | 5.0 | 37 | 37 | 36 | 36 |
| 9 | 14 | 20 | I(93)SA(91)SCγ*(89)SCA*(?)Cr | 4.9 | | 4.6 | | 36 | | |
| 10 | 15 | 20 | I(101)SA(93)SCγ*(88)SCA*(–27)Cr | | | 4.3 | 35 | 34 | | |
| 11 | 1 | 20 | I(101)SA(94)SCγ*(90)SCA*(9)SX(–23)Cr | | | 4.6 | | 35 | | |
| 12 | 2 | 20 | I(91)SA(87)SCγ*(79)SCA*(–1)SX(?)Cr | 4.9 | 4.9 | 3.9 | | | 33 | |

*1: (°C.) stands for (Tc–T). Tc is a transition temperature from SCγ* to SCA* and T is a measurement temperature.

As specified above, the present invention provides novel anti-ferroelectric liquid crystal compositions for practical use. The anti-ferroelectric liquid crystal compositions provided by the present invention show low threshold voltages thereby to decrease the driving voltage, and can be used in liquid crystal display devices using a fast response time or switching among tristable states, distinct threshold voltage properties and good memory performance.

What is claimed is:

1. An anti-ferroelectric liquid crystal composition consisting essentially of an eutectic mixture of at least one of an anti-ferroelectric liquid crystal (A) compound and at least one of a ferroelectric liquid crystal (B) compound, wherein the anti-ferroelectric liquid crystal (A) has a smectic A phase and has a melting point equal to or lower than room temperature and a tilt angle of at least 25°, and has a phase sequence of isotropic phase—smectic A phase—anti-ferroelectric phase—crystal phase, the anti-ferroelectric liquid crystal (A) is at least one compound selected from the group consisting of $C_8H_{17}$—O—Ph—Ph—COO—Ph(3-F)—COO—
　$C^*H(CH_3)(CH_2)_5OC_2H_5$ $C_8H_{17}$—O—Ph—Ph—COO—Ph(3-F)—COO—
　$C^*H(CF_3)(CH_2)_5OC_2H_5$ $C_8H_{17}$—O—Ph—Ph—COO—Ph(3-F)—COO—$C^*H(CH_3)C_8H_{17}$ $C_8H_{17}$—O—Ph—Ph—COO—Ph—COO—$C^*H(CF_3)(CH_2)_5Oc_2H_5$ and $C_9H_{19}$—O—Ph—Ph—COO—Ph—(3-F)—COO—
　$C^*H(CF_3)(CH_2)_5OC_2H_5$, the ferroelectric liquid crystal (B) is at least one compound selected from the group consisting of $C_8H_{17}$—O—Ph—COO—Ph—Ph—COO—$C^*H(CH_3)C_4H_9$ $C_{10}H_{21}$—O—Ph—Ph—COO—Ph—COO—$C^*H(CH_3)C_5H_{11}$ $C_{12}H_{25}$—O—Ph—Ph—COO—Ph—COO—$C^*H(CH_3)C_7H_{15}$ $C_8H_{17}$—O—Ph—CH_2O—Ph—Ph—COO—
　$C^*H(CF_3)(CH_2)_2OC_2H_5$ $C_9C_{19}$—O—Ph—CH_2O—Ph—Ph—COO—
　$C^*H(CF_3)(CH_2)_2OC_2H_5$ $C_{10}H_{21}$—Ph—Ph—COO—Ph—COO—$C^*H(CH_3)C_6H_{13}$ $C_9H_{19}$—O—Ph—CH_2O—Ph—Ph—COO—
　$C^*H(CF_3)CH_2COOC_2H_5$ $C_8H_{17}$—O—Ph—COO—Ph—COO—
　$C^*H(CF_3)CH_2COOCH_3$ $C_8H_{17}$—O—Ph—COO—Ph—COO—$C^*H(CH_3)CH_2OC_6H_{13}$ $C_9H_{19}$—O—Ph—COO—Ph—COO—$C^*H(CH_3)CH_5H_{11}$ $C_{12}H_{25}$—O—Ph—Ph—COO—Ph—COO—$C^*H(CH_3)C_5H_{11}$ $C_{11}H_{23}$—O—Ph—Ph—COO—Ph—COO—$C^*H(CH_3)C_7H_{15}$ $C_{10}H_{21}$—O—Ph—CH_2O—Ph—Ph—COO—
　$C^*H(CF_3)(CH_2)_2OC_2H_5$ and $C_8H_{17}$—O—Ph—CH_2O—Ph—Ph—COO—
　$C^*H(CF_3)CH_2COOC_2H_5$ in which —Ph— represents a benzene ring bonding to a p-position and C* represents an optically active carbon atom, and the ferroelectric liquid crystal (B) is contained in an amount sufficient to decrease a voltage required for driving the anti-ferroelectric liquid crystal (A).

2. The composition of claim 1, wherein the ferroelectric liquid crystal (B) is at least one compound selected from the group consisting of $C_8H_{17}$—O—Ph—COO—Ph—Ph—COO—C*H(CH$_3$)C$_4$H$_9$ $C_{10}H_{21}$—O—Ph—Ph—COO—Ph—COO—C*H(CH$_3$)C$_5$H$_{11}$ $C_{12}H_{25}$—O—Ph—Ph—COO—Ph—COO—C*H(CH$_3$)C$_7$H$_{15}$ $C_8H_{17}$—O—Ph—CH$_2$O—Ph—Ph—COO—
 C*H(CF$_3$)(CH$_2$)$_2$OC$_2$H$_5$ $C_9C_{19}$—Ph—CH$_2$O—Ph—Ph—COO—C*H(CF$_3$)(CH$_2$)$_2$OC$_2$H$_5$ $C_{10}H_{21}$—Ph—Ph—COO—Ph—COO—C*H(CH$_3$)C$_6$H$_{13}$ $C_8H_{17}$—O—Ph—Ph—COO—Ph—COO—
 C*H(CF$_3$)CH$_2$COOCH$_3$ $C_9H_{19}$—O—Ph—Ph—COO—Ph—COO—C*H(CH$_3$)C$_5$H$_{11}$ $C_{12}H_{25}$—O—Ph—Ph—COO—Ph—COO—C*H(CH$_3$)C$_5$H$_{11}$ $C_{11}H_{23}$—O—Ph—Ph—COO—Ph—COO—C*H(CH$_3$)C$_7$H$_{15}$ and $C_{10}H_{21}$—O—Ph—CH$_2$O—Ph—Ph—COO—
 C*H(CF$_3$)(CH$_2$)$_2$OC$_2$H$_5$, in which —Ph— represents a benzene ring bonding to a p-position and C* represents an optically active carbon atom.

3. The composition of claim 1, wherein the ferrielectric liquid crystal (B) is at least one compound selected from the group consisting of $C_8H_{17}$—O—Ph—COO—Ph—Ph—COO—C*H(CH$_3$)C$_4$H$_9$ $C_{10}H_{21}$—O—Ph—Ph—COO—Ph—COO—C*H(CH$_3$)C$_5$H$_{11}$ $C_{12}H_{25}$—O—Ph—Ph—COO—Ph—COO—C*H(CH$_3$)C$_7$H$_{15}$ $C_8H_{17}$—O—Ph—CH$_2$O—Ph—Ph—COO—
 C*H(CF$_3$)(CH$_2$)$_2$OC$_2$H$_5$ $C_9C_{19}$—Ph—CH$_2$O—Ph—Ph—COO—C*H(CF$_3$)(CH$_2$)$_2$OC$_2$H$_5$ and $C_{10}H_{21}$—Ph—Ph—COO—Ph—COO—C*H(CH$_3$)C$_6$H$_{13}$, in which —Ph— represents a benzene ring bonding to a p-position and C* represents an optically active carbon atom.

4. The composition of claim 1, wherein the ferroelectric liquid crystal (B) is contained in an amount of 20 to 80% by wt. based on the weight of the composition and sufficient to decrease a voltage required for driving the anti-ferroelectric liquid crystal (A).

5. The composition of claim 1, wherein the anti-ferroelectric liquid crystal (A) and the ferroelectric liquid crystal (B) are contained in an anti-ferroelectric liquid crystal/ferroelectric liquid crystal mixing ratio of 9/1 to 1/4.

6. The composition of claim 1, which has a phase system of isotropic phase—smectic A phase—anti-ferroelectric phase—crystal phase.

7. The composition of claim 1, which has a driving voltage of 35 V or less.

8. A liquid crystal display device comprising the composition of claim 1.

9. The liquid crystal display device of claim 8 which has a driving voltage of 35 V or less.

* * * * *